United States Patent
Papenfort et al.

(10) Patent No.: US 8,824,283 B2
(45) Date of Patent: Sep. 2, 2014

(54) CONTROL NODE, A NETWORK OF CONTROL NODES AND A NETWORK CONFIGURATOR

(75) Inventors: Josef Papenfort, Hüllhorst (DE); Ralf Heitmann, Leopoldshöhe (DE); Gerd Hoppe, Rheda-Wiedenbrück (DE)

(73) Assignee: Beckhoff Automation GmbH, Verl (DE)

( * ) Notice: Subject to any disclaimer, the term of this patent is extended or adjusted under 35 U.S.C. 154(b) by 287 days.

(21) Appl. No.: 12/708,042

(22) Filed: Feb. 18, 2010

(65) Prior Publication Data

US 2010/0208586 A1 Aug. 19, 2010

Related U.S. Application Data

(63) Continuation of application No. PCT/EP2008/060856, filed on Aug. 19, 2008.

(30) Foreign Application Priority Data

Aug. 21, 2007 (DE) .................... 10 2007 039 427

(51) Int. Cl.
*G01R 31/08* (2006.01)
*H04L 12/413* (2006.01)
*G05B 19/418* (2006.01)
*H04L 12/403* (2006.01)
*H04L 12/40* (2006.01)

(52) U.S. Cl.
CPC ..... *H04L 12/4035* (2013.01); *H04L 2012/4026* (2013.01); *H04L 12/413* (2013.01); *G05B 19/4186* (2013.01)
USPC .......................................... 370/230; 370/401

(58) Field of Classification Search
USPC ................... 370/230, 235, 252, 401, 466
See application file for complete search history.

(56) References Cited

U.S. PATENT DOCUMENTS 5,838,718 A * 11/1998 Ichihashi .................. 375/133
6,052,370 A *  4/2000 Ogura ....................... 370/389

(Continued)

FOREIGN PATENT DOCUMENTS

CN         1777848       5/2006
DE       102 15 989    10/2003

(Continued)

OTHER PUBLICATIONS

Winkel, Ludwig. "Real-Time Ethernet in IEC 61784-2 and IEC 61158 series," IEEE International Conference on Industrial Informatics—2006, pp. 246-250, Aug. 1, 2006.

(Continued)

*Primary Examiner* — Ricky Ngo
*Assistant Examiner* — Christine Ng
(74) *Attorney, Agent, or Firm* — Dorsey & Whitney LLP (57) ABSTRACT

A control node for a network of control nodes includes a transmitter module configured to manage the data to be sent in an output process image, to convert the output process image into a data packet and to output the data packet onto the network at a predetermined point in time. The control node further includes a receiver module configured to log on to the data packets of one or of a plurality of transmitter modules of further control nodes and to convert a received data packet into an input process image. The data transmission between the control nodes in the network takes place in the form of data packets.

33 Claims, 5 Drawing Sheets

(56) References Cited

U.S. PATENT DOCUMENTS

| | | | | |
|---|---|---|---|---|
| 6,151,495 | A * | 11/2000 | Rune | 455/426.1 |
| 6,188,338 | B1 * | 2/2001 | Yokose | 341/65 |
| 6,244,758 | B1 * | 6/2001 | Solymar et al. | 709/224 |
| 6,363,053 | B1 * | 3/2002 | Schuster et al. | 370/230 |
| 6,430,218 | B1 | 8/2002 | Mito | |
| 6,907,470 | B2 * | 6/2005 | Sawada et al. | 709/244 |
| 6,993,042 | B1 | 1/2006 | Akatsuka et al. | |
| 7,193,738 | B2 * | 3/2007 | Yuasa | 358/1.15 |
| 7,420,985 | B2 * | 9/2008 | Bruckner et al. | 370/442 |
| 7,483,380 | B2 * | 1/2009 | Metke | 370/238 |
| 7,502,389 | B2 * | 3/2009 | Shinomiya et al. | 370/522 |
| 7,606,169 | B2 * | 10/2009 | Nelson | 370/254 |
| 7,853,706 | B2 | 12/2010 | Janssen et al. | |
| 2002/0131451 | A1 | 9/2002 | Franke et al. | |
| 2003/0145283 | A1 * | 7/2003 | Machida et al. | 715/513 |
| 2003/0158959 | A1 * | 8/2003 | Jayapalan et al. | 709/237 |
| 2003/0208585 | A1 * | 11/2003 | Shinomiya et al. | 709/223 |
| 2006/0045132 | A1 | 3/2006 | Metke | |
| 2009/0282234 | A1 * | 11/2009 | Faraboschi et al. | 713/2 |

FOREIGN PATENT DOCUMENTS

| | | |
|---|---|---|
| JP | 2000-032409 | 1/2000 |
| JP | 2001-160814 | 6/2001 |
| JP | 2002-519746 | 7/2002 |
| JP | 2003-084809 | 3/2003 |
| JP | 2005-295403 | 10/2005 |
| JP | 2010-521414 | 6/2010 |
| WO | WO 99/67690 | 12/1999 |
| WO | WO 2005/066728 | 7/2005 |

OTHER PUBLICATIONS

Felser, Max. "Real-Time Ethernet—Industry Prospective," Proceedings of the IEEE, IEEE, New York, US, vol. 93, No. 6, Jun. 1, 2005.

English translation of Office Action from Japanese Patent Office. Japanese Patent No. 2010-521414. Mailed Jan. 10, 2012. 4 pages.

Translation of office action issued in connection with Chinese Patent Application No. 200880109692.6. 6 pages.

* cited by examiner

CONTROL NODE, A NETWORK OF CONTROL NODES AND A NETWORK CONFIGURATOR

CROSS-REFERENCE TO RELATED APPLICATIONS

This application is a continuation of PCT Application No. PCT/EP2008/060856, filed Aug. 19, 2008, entitled "Control Node for a Network of Control Nodes," which claims priority to German Application No. 10 2007 039 427.8 filed Aug. 21, 2007. The entire content of both applications is hereby incorporated by reference.

FIELD

The present invention relates to a control node, a network of control nodes and a network configurator.

BACKGROUND

Present-day concepts for industrial automation are based on the idea of decentralized controlling. The control task to be carried out is divided up among the control nodes of the decentralized control system in a geographically and functionally optimal manner. Thereby, the control nodes communicate with each other and with the superordinate systems via local networks. By means of the decentralized control, the time and effort involved in the communication process may be reduced as the individual control nodes autonomously take over control tasks relating to their respective areas and only have to communicate with the further control nodes and/or with the superordinate systems for coordination purposes.

In this context, the decentralized control is based on the idea of subdividing the automation task among individual functional and logically complete modules which may then be arranged in close proximity to the process, thus reducing the wiring and installation involved. By subdividing into modules, complexity may be reduced in order to enable a simpler functionality.

The Ethernet concept is the most widespread communication standard in local area networks. The Ethernet is based on a LAN configuration in which a plurality of control nodes, such as computers or machines, is connected to each other via a shared transmission medium, the Ethernet protocol carrying out the encapsulation of the data to be transmitted into data packets, in the following also referred to as telegrams, having a predetermined format.

Ethernet protocols are predominantly used for office communication networks. Due to the advantages of the Ethernet concept in using standard hardware and software components and due to the possibility of achieving high data transmission rates while utilizing a simple network technology, the Ethernet network communication is increasingly used in industrial manufacturing, as well, in order to exchange data between control nodes.

When controlling machines in industrial automation, it is required to cyclically process the control task without time fluctuations, i.e. with only little deviations from the desired cycle time in the range of a few microseconds, thereby reacting to the control demand with a foreseeable response time. Real-time functionality and fast response times as demanded in industrial automation, are, however, of only secondary significance in standard data processing applications for which the Ethernet communication is typically used. In order to guarantee real-time functionality and fast response times when using Ethernet communication in industrial automation, methods have been developed for prioritising Ethernet telegrams for real-time applications. Moreover, such modern data transmission processes frequently allow for the parallel use of the network for real-time and non-real-time applications, as well.

In spite of the increasing use of decentralized open control systems in which data transmission is carried out on the basis of the Ethernet protocol and the cost advantages resulting therefrom, a return-of-investment problem still exists in industrial automation, particularly due to increasingly shortening product cycles. Although new products are already developed in a way to allow for their simple automated production, the automation systems for manufacturing the products are usually specifically designed for the product to be manufactured and thus, adapting them to product and process modifications is only possible by means of a high amount of time and effort.

SUMMARY

The present invention provides a control node, a network of control nodes and a network configurator which allow for a flexible system management.

One embodiment of the present invention provides a control node for a network of control nodes. The control node comprises a transmitter module configured to manage the data to be sent in an output process image, to convert the output process image into a data packet and to output the data packet onto the network at a predetermined point in time. The control node further comprises a receiver module configured to log on to the data packets of one or of a plurality of transmitter modules of further control nodes and to convert a received data packet into an input process image. The data transmission between the control nodes in the network takes place in the form of data packets.

Another embodiment of the present invention provides a system comprising a network of control nodes and a network configurator. At least one control node includes subscribers. The network configurator is configured to determine the communication relations between the control nodes and between the subscribers in the control node.

Another embodiment of the present invention provides a network comprising control nodes and a network configurator. The data transmission between the control nodes in the network takes place in the form of data packets. Each control node comprises a transmitter module configured to manage the data to be sent in an output process image, to convert the output process image into a data packet and to output the data packet onto the network at a previously determined point in time. Each control node further comprises a receiver module configured to convert a received data packet into an input process image. The network configurator comprises a recording module in order to determine the control nodes connected to the network, a configuration module for determining the communication relations of the transmitter and receiver modules of the determining control nodes, as well as a programming module for transmitting the communication relations determined by the configuration module between the control nodes in the network to the control nodes, the receiver module of the control node being configured to log on for the data packets of one or of a plurality of transmitter modules of further control nodes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim. Likewise, reference to "the invention" shall not be construed as a generalization of any inventive subject matter disclosed herein and shall not be considered to be an element or limitation of the appended claims except where explicitly recited in a claim.

Also, signal names used below are exemplary names, indicative of signals used to perform various functions. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any device.

Figure 1:
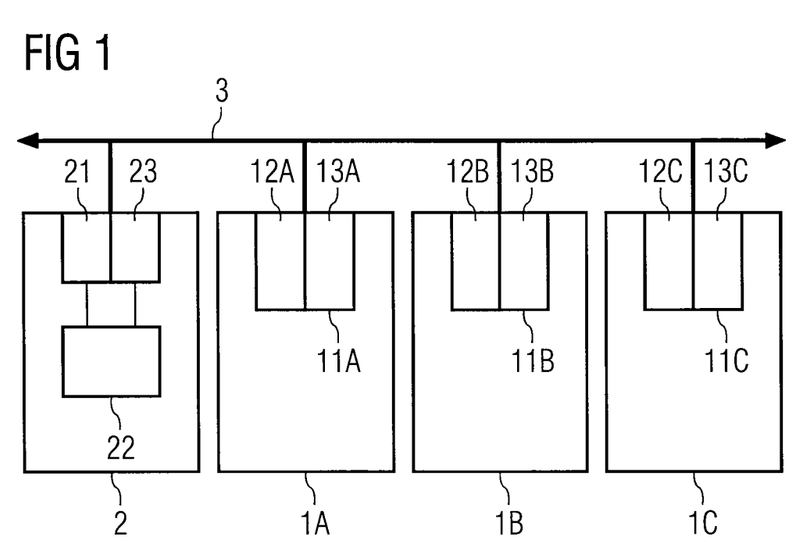
FIG. 1 shows a schematic diagram of a network having control nodes and a network configurator.

In industrial automation, i.e. the controlling and monitoring of technical processes by means of software, decentralized control systems are increasingly used. In decentralized control systems, the control task is divided up among control nodes. The control nodes thereby communicate with each other and, if necessary, with the superordinate systems via an industrial local network. FIG. 1 shows such a decentralized control system comprising three control nodes 1A, 1B, 1C and a network configurator 2 for configuring and monitoring the network. The control nodes 1 and the network configurator 2 thereby form a local communication network, which is known as a local area network. LANs are local communication networks which are limited to a geographical area and consist of one or more servers or work stations, known as control nodes, which are connected to each other via a communication line 3, e.g. a twisted-pair cable or a fibre-optic cable. For LANs, various network configurations are conceivable, the most common being the bus, ring, star and tree structure. FIG. 1 shows a LAN configuration having a bus structure.

An essential demand to the LAN when utilized in industrial automation as what is known as a field-bus system is real-time functionality. The field-bus system must guarantee that each transmitted data packet reaches the recipient within a limited guaranteed time. LANs are operated by means of a network operating system and a unified network protocol. Thereby, the preferred communication standard is the Ethernet concept. The Ethernet concept actually offers the possibility of using standard hardware and software components. Furthermore, the Ethernet concept is marked by a simple network technology while simultaneously having a high data transmission rate.

In the OSI layer model, the international reference model for data transmission in networks which is made up of a stack of seven layers, whereby an amount of protocols is defined by each layer which allocates its service to the respective next higher level, the internet protocol is allocated to the second layer, which is known as conductor layer. In this conductor layer, the data to be transmitted are bundled to form packets to which specific information for the respective communication protocol is added. Within the network, the conductor layer is responsible for transmitting the data packets from control node to control node as well as for error detection. In the Ethernet concept, the conductor layer is divided up into two levels, the first level adding a first head section to the data, the head section comprising information required for a correct data transmission by the receiving protocol. On the second level, the data packet to be transmitted is then encapsulated with a further head section and an end section for the transport of the data packets from control node to control node. By means of such Ethernet packets which are also referred to as Ethernet telegrams, data having a length of up to 1500 bytes can be transmitted.

In order to be able to also use the Ethernet concept in industrial automation which requires real-time functionality, each control node 1 comprises a network interface 11 for real-time operation. Thereby, the network interface 11 may be realized within the control node in terms of hardware as well as software technology. The network interface 11 within the control node 1 allows for the parallel use of the bus system 3 for determining data for real-time applications and non-real-time applications. The data for real-time applications are thereby prioritized by the network interface 11 so that at first real-time data are transmitted, and in the time remaining until transmission of the next real-time applications the data for non-real-time applications are transmitted.

For the data transmission via the bus system 3, the network interface 11 of the control nodes 1 is subdivided into a transmitter module 12 and a receiver module 13. The transmitter module 12 manages the data to be transmitted in an output process image. The data packets are e.g. transmitted in the form of Ethernet telegrams. The transmitter module 12 of the transmitting control node 1 converts the output process image into a data packet according to the network protocol and then outputs the data packet onto the network at a predetermined point in time. The receiver module 13 of the receiving control node 1—the receiver module 13 may be logged on for receiving data packets outputted by one or more transmitter modules 12 by further control nodes 1—then converts the received data packet into an input process image which may be processed by the control node 1.

By means of this configuration, it is possible to determine the communication relations between the control nodes in the network flexibly and even during system cycle time, i.e. dynamically, and thus to achieve a decentralized control system having a high compatibility with regard to the utilized apparatuses and devices in a simple manner. Modifications in the production and manufacturing process, e.g. extending or changing the range of production, may be carried out in a simple manner by changing the communication relations, i.e. re-determination of the transmitter-receiver-module relations which indicate which control node must transmit data to which further control nodes.

The determination of the communication relations of the transmitter and receiver modules is preferably carried out within the framework of an initializing phase by means of the network configurator 2. The network configurator 2 therefore comprises a recording module 21 in order to determine the control nodes connected to the network. The recording module 21 is connected to a configuration module 22 in the network configurator 2 which determines the communication relations of the transmitter and receiver modules 12, 13 of the determining control nodes 1, i.e. which control node is to log on to which other control node by means of its receiver module in order to receive data from its transmitter module. The configuration module 22 is in turn connected to a programming module 23 which then transmits the communication relations determined by the configuration module between the control nodes within the network to these control nodes.

However, the network configurator 2 is able to dynamically adapt the communication relation between the control nodes and/or the subscribers in the control nodes after the initializing phase, as well. By means of this configuration, a reaction to an extension or modification of the product range is possible in a simple manner. The network configurator 2 then allows for carrying out corresponding adaptations of the communication relations between the individual control nodes and/or the subscribers within the control nodes by simple re-programming.

Figure 2:
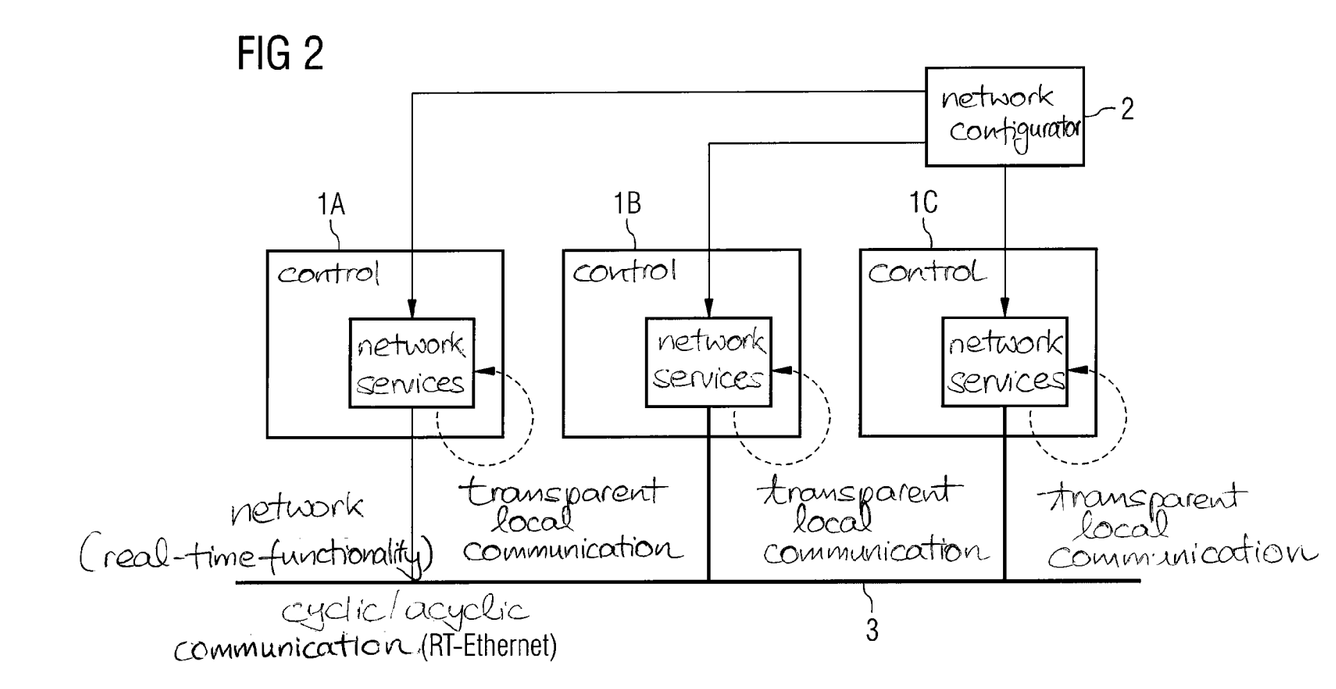
FIG. 2 shows an initializing phase in a network.

The initializing phase of the decentralized control system shown in FIG. 1 is shown in detail in FIG. 2. Therein, the arrows in the Figure indicate the executed data exchange. In a first step of the initializing phase, the network configurator 2 records the control nodes 1 connected to the network. The control nodes therefore comprise an unambiguous address associated to the respective control node via which the control node may be addressed. The control node may acquire this address e.g. during booting at the bus system via the dynamic host configuration protocol or via automatic IP. However, the address may also have been preliminarily stored within the control node.

For automatically recognizing the control nodes 1, the network configurator 2 may use various mechanisms. The recording module of the network configurator 2 may transmit what is known as a broadcast telegram to all control nodes 1 connected to the network 3. The controls nodes 1 then respond to this broadcast telegram by means of a reply telegram, thereby announcing their valid address. Alternatively, it is possible that each control node automatically transmits an identification telegram to the recording module of the network configurator 2 containing its address during booting.

In parallel to the address detection, the recording module of the network configurator 2 may also retrieve a device specification characterizing the network properties and the function of the control node from the control node and/or the control node may automatically transmit the device specification to the recording module of the network configurator during booting.

On the basis of the number of determined control nodes as well as their device properties, the configuration module of the network configurator 2 then determines the communication relations between the control nodes at the network, i.e. which control node is supposed to log on to which other control node by means of its receiver module for receiving data of its transmitter module. For this purpose, the configuration module preferably comprises a system object model comprising a standardized system illustration and a process description which are combined with the device properties of the determined control nodes in order to define the communication relations. As an alternative to entering the device specification via the control nodes, the device specification may also be read in via an external database or be directly entered into the network configurator 2 via a man-machine interface. The system illustration and the process description may be provided to the network configurator e.g. via an engineering system.

The communication relations between the control nodes 1 determined by the network configurator 2 respectively indicate the transmitter module transmitting the data and the receiver module receiving the data as well as the data transmission type and the data type. The data to be transmitted are divided up into incidental data, device data and process data. Incidental data e.g. serve to determine and/or to monitor the operating mode and the operating state of the control nodes, or to transmit device data, which are not subject to real-time demands between nodes. Such incidental data may be the occurrence of an error, a notification on the operating state, the modification of a process signal etc. Device data may be calibrating data, process and product parameters or other data. The incidental data and the device data are usually exchanged between the control nodes in an acyclic manner. In contrast thereto, process data are typically functional data necessary for the process and manufacturing flow. The process data required for the real-time application are exchanged between the control nodes in a cyclic manner in order to guarantee a defined data transmission. Data not required for real-time transmission such as process and product parameters, i.e. device data, are, on the other hand, transmitted between the control nodes in an acyclic manner.

The data records comprising the communication relations are written into the control nodes 1 via the bus system 3 by means of the programming module of the network configurator 2. In addition thereto, the network configurator 2 may also transmit the product and process parameter for carrying out the desired production and manufacturing processes to the control nodes. Upon finalizing the initialization process, the decentralized control is then switched to machine operation in order to carry out the desired production and manufacturing process. In this operating mode, the network configurator 2 is no longer required. The network configurator 2 may then either be switched off or take over a monitoring function in the production and manufacturing process, i.e. for example malfunction monitoring and diagnosis.

During the production and manufacturing process, the control nodes exchange process and incidental data according to the communication relations provided by the network configurator. The transmitter module of the transmitting control node may thereby transmit data directly to the receiver module of the receiving control node in a point-to-point connection. As an alternative, the transmitter module of the transmitting control node may also send the data to the receiver modules of a plurality of receiving control nodes. Moreover, there is the possibility of transmitting the data via the transmitter module of the transmitting control node to the receiver modules of all control nodes connected to the network. As a general rule, non-real-time data are thereby exchanged in an acyclic manner via point-to-point connections. Such non-real time data are incidental data or product and process parameters. Process data, on the other hand, which are required for executing real-time applications, are transmitted to all control nodes in a cyclic manner. In the case of real-time data, point-to-multiple-point connections and/or broadcast transmissions may be carried out.

Figure 3:
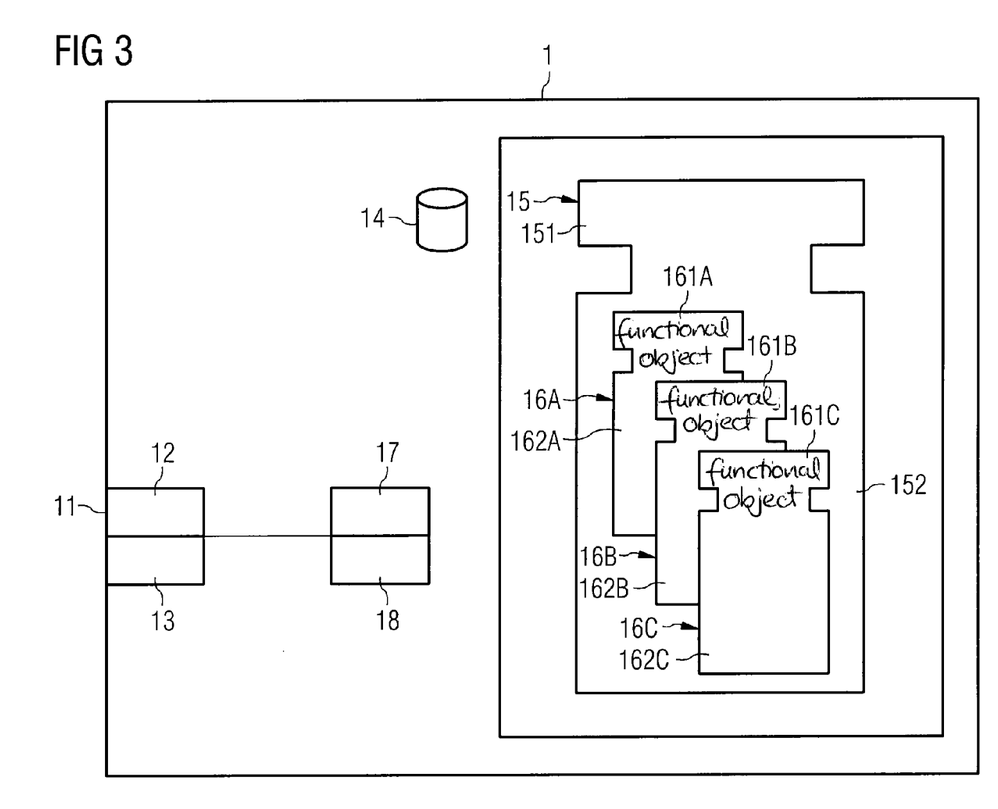
FIG. 3 shows a control node architecture.

FIG. 3 schematically shows the potential configuration of a control node. Apart from the network interface 11 comprising the transmitter module 12 and the receiver module 13, each control node comprises a device specification representing the functional and communicational properties of the control node. The form of this device specification is preferably standardized for all control nodes and stored in the memory area 14 of the control node as a file. As explained above, the device specification may be accessed by superordinate systems or by the network configurator. The device specification may also be modified externally, i.e. in turn by the network configurator and/or a superordinate system or by a man-machine interface in order to adapt the functional and communicational properties of the control node to the current state.

The device specification of the control node illustrating the hardware of the control node and its functions and/or the interface to the outside is associated with a machine model 15 in the control node. The machine model 15 images the device properties in the form of functionalities and thus decouples the device functionalities from the genuine hardware control. By means of the machine model, the system and/or the functionalities within the control nodes may be modularized in a simple and effective manner, thus configuring a decentralized control system. The machine model encapsulates the device functionality and thus provides autonomous module units which may be operated in a self-sustaining manner, i.e. without managing system, for all device, communication and functional units, each following a unified abstract operational flow.

The machine model 15 is thereby divided up into an organizing unit 151 and a functional unit 152. The organizing unit 151 determines the state of the control node. The state of the control node indicates the operating mode, i.e. if the machine is operated manually, semi-automatically or automatically, and if the machine is in an initializing mode or in a machine-operation mode. Moreover, the operating state of the control node is defined in the organizing unit. Operating states may e.g. be start, stop or error mode. The operating states are unambiguously defined and processed by the organizing unit 151 of the machine model 15 in the control node 1. Furthermore, the organizing unit 151 of the machine model 15 in the control node 1 provides that the transitions between the operating states are unambiguous. The organizing unit 151 thus represents a finite state machine which provides that the desired state is achieved by the control node even without relying on outside events.

The functional unit 152 of the machine model 15 in the control node 1 comprises the application programmes associated with the respective operating states which are initialized by the functional unit 152 depending on the operating state set by the organizing unit. The application programmes in the functional units of the control nodes are accessed via individual identifications. The organizing unit 151 thereby comprises the identification and the functional parameters of the functional unit 152 to be accessed and carries out the access. Thereby, a functional unit provides an elementary function which may parameterized from the outside. The total functionality then results from the configuration of the elementary functions. These elementary functions may be composed of subordinate elementary functions and in turn form an elementary super function.

The control nodes preferably are subdivided into subscribers 16A, 16B, 16C which individually and in a self-sustained manner define accessible functionalities of the control node. The subdivision of the control nodes into subscribers is freely configurable and independent from the real hardware control. The subscribers are in turn divided up analogously to the machine model, namely into an organizing unit 161 for processing the finite state machine determining the operating mode and the operating state, and a functional unit 162 for executing the application program associated with the respective operating type and the respective operating state. The subscribers of the control node may thereby be organized equivalently or hierarchically with regard to their functions. In particular, it is possible that the functionality of a subscriber is in turn subdivided into several sub-functionalities comprising a plurality of sub-subscribers which are configured analogously to the superordinate subscribers. Dividing up the control nodes into subscribers provides for a further simplification of the modularization, in particular with regard to the required determination of the communication relations. The subscribers and/or the functional units 162 contained therein are functionally independent units which may be independently configured and accessed.

By subdividing the control nodes into subscribers, the data communication rate may furthermore be optimized. In the case of a data transmission between the control nodes, the data transmission is carried out according to the network protocol, i.e. in particular according to the Ethernet protocol, whereby the transmitting control node converts the output process image to be transmitted into a network data packet, i.e. for example an Ethernet telegram, by means of its transmitter module, and then outputs the data packet to the network at a predetermined point in time. The control nodes which are logged on to this transmitter module by means of their receiver modules then re-convert the received data packet into an input process image. If, in contrast thereto, the data communication is to be carried out internally within the control nodes between the subscribers in the control node, the data exchange is preferably carried out in a transparent manner by means of data imaging processes with a direct data access of the subscribers to the control node process image transmitted between the subscribers. These direct data imaging processes of the subscribers in the control nodes provide for a fast data exchange without extensive conversion processes and/or transfer processes via the transmitter and receiver modules.

The data transmission processes, i.e. the direct data imaging between the subscribers and the network protocol conversions between the control nodes are preferably provided by the network configurator in the context of the initializing process described above. The communication relations between the subscribers in the control node are thereby subdivided into incidental, parameter and process data streams in an analogous manner to the communication relations between the control nodes. At the same time, the type of data transmission between the subscribers, i.e. if the data transmission is to be carried out in a cyclic or acyclic manner, is determined.

Figure 4:
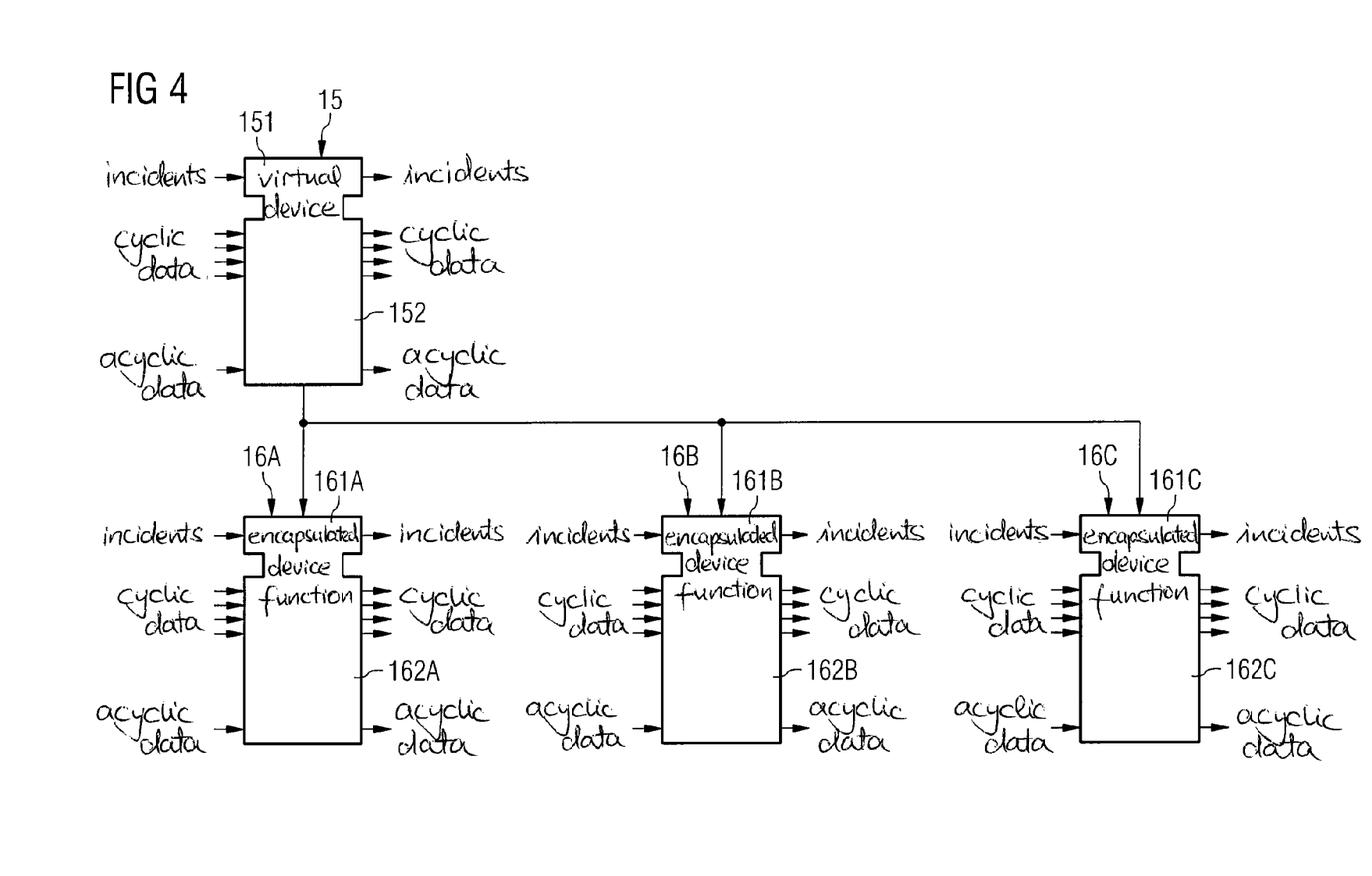
FIG. 4 is a detailed illustration of the control node architecture shown in FIG. 3.

FIG. 4 shows potential data streams in the control node 1 shown in FIG. 3 having the machine model 15 which comprises three subscribers 16 each encapsulating a device function, the organizing unit representing the interface to the incidental data streams and the functional unit representing the interface to the process data streams. The incidental data streams transmit information on the operating type and are preferably exchanged in an acyclic manner. The process data streams on the one hand comprise process data which are exchange changed cyclically, but also product and process parameters or further static data, i.e. device data, which are transmitted in an acyclic manner. The incidental, parameter and process data streams between the subscribers in the control nodes may thereby be carried out from one subscriber to the next subscriber or also in parallel to a plurality of subscribers or to all subscribers.

In order to process the incidental, parameter and process data streams, the control nodes each obtain an incident-recording module 17 and a data recording module 18 which are connected to the network interface 11 comprising the transmitter module 12 and the receiver module 13, as shown in FIG. 3. Incidents, i.e. indications, notifications, errors in the ongoing machine operation etc. are classified and latched by the incident recording module 17. Further, particularly superordinate, control nodes have the possibility of accessing the latched incidents. The incidents are thereby classified as incidents which must be acknowledged and incidents which do not have to be acknowledged. Incidents that must be acknowledged have to be acknowledged by an authorized unit before they can be removed from the incident recording module 17. The data recording module 18 stores the process data and allows for further, particularly superordinate, subscribers and/or control nodes to access these process data.

Figure 5:
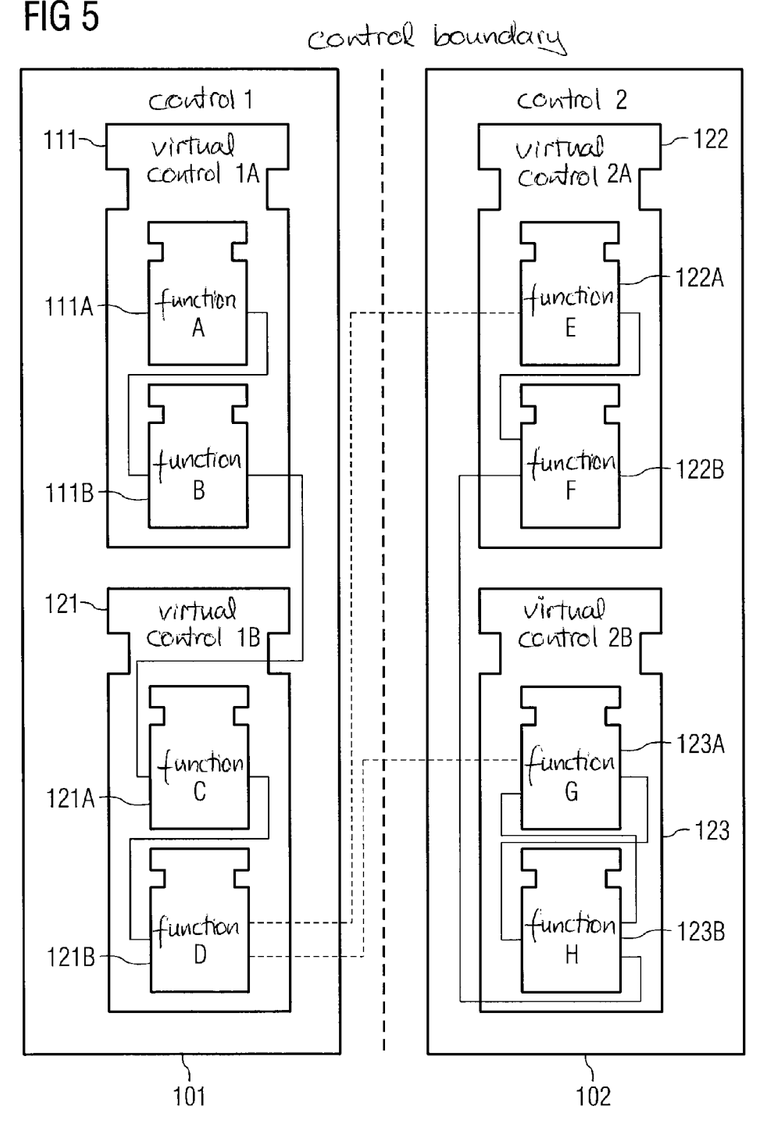
FIG. 5 illustrates a data exchange between two control nodes having two subscribers, respectively.

FIG. 5 shows a section of a decentralized control system comprising two control nodes 101, 102, the machine model of which is subdivided into four subscribers 111, 121, 122, 123 having separate functions, respectively. Each subscriber in turn comprises two sub-subscribers 111A, 111B, 121A, 121B, 122A, 122B, 123A, 123B representing independent device functionalities. In FIG. 5, the data transmission paths between the control nodes and/or in the control nodes between the subscribers and/or the sub-subscribers are illustrated. The data transmission in each control node is thereby carried out in the form of data imaging processes, which allows for an effective fast data exchange. The data transmission between the control nodes is carried out in the form of network telegrams which are converted into the process images.

The data transmission path thereby starts at control node 101, namely in the subscriber 111 and there in the sub-subscriber 111A, and from there proceeds to sub-subscriber 111B. From the sub-subscriber 111B of the subscriber 111, the data transmission path then leads to the sub-subscribers 121A of the subscriber 121 and from there to the sub-subscribers 121B in the subscriber 121. A further data exchange is then carried out across the boundaries of the control node from the sub-subscriber 121B in the subscriber 121 of the control node 101 to the sub-subscriber 122A of the subscriber 122 and to the sub-subscriber 123A of the subscriber 123 of the control node 2. This data exchange is carried out according to the network protocol via the transmitter-receiver modules of the control nodes, the transmitter module converting the output process image of the sub-subscriber 121B into data packets and transmitting them to the receiver module of the control node 2, the receiver module in turn converting the data packets into an input process image and transmitting it to the sub-subscriber 122A in the subscriber 122 and the sub-subscriber 123A in the subscriber 123. The data transmission in the control node 102 is then carried out from the sub-subscriber 122A to the sub-subscriber 122B of the subscriber 122 and from there to the sub-subscriber 123B of the subscriber 123 and further to the sub-subscriber 123A of the subscriber 123. At the same time, a data transmission starting from the sub-subscriber 123A of the subscriber 123 to the sub-subscriber 123B of the subscriber 123 is carried out, as well.

It is the object of the present invention to provide a control node for a network of control nodes and a system comprising such a control node which allow for a flexible system management.

According to the invention, the control node comprises a transmitter module for exchanging data with further control nodes in the network in the form of data packets, the transmitter module being configured to manage the data to be transmitted in an output process image, to convert the output process image into a data packet and to output the data packet onto the network at a predetermined point in time. Moreover, the control node comprises a receiver module configured to log on to the data packets of one or of a plurality of transmitter modules of further control nodes and to convert a received data packet into an input process image.

The inventive configuration of the control node allows for decentralized control in the form of an open system having high compatibility and flexibility with regard to the functionality of the control nodes. All control nodes actually comprise simple and unified communication services which may be adapted to any desired production or manufacturing process without involving a large amount of time and effort. The inventive transmitter-receiver-communication model allows for representing the data exchange between the control nodes in the form of a simple process image for the operator of the system on the outside. Due to the fact that a control node may log on to the data packets of a plurality of control nodes by means of its receiver module, the communication relations between the control nodes may be determined in a flexible manner in order to carry out the desired production and manufacturing processes within the system.

The receiver module of the control node may be configured to associate a quality date with the received data packet, the quality date indicating the age of the data packet. From the time delay between sending and arrival of the data, the control node may determine the quality of the data communication. The application program within the control node may then respond to this quality value.

The transmitter module may directly address the data packet to one or to a plurality of further control nodes, thereby preferably transmitting non-real-time data in an acyclic manner. Alternatively, however, the transmitter module may forward the data packet to all control nodes present in the network, thereby preferably transmitting real-time data in a cyclic manner. By means of this configuration, a parallel data transmission of real-time data and non-real-time data may be carried out. The real-time data are cyclically distributed to all control nodes while the non-real-time data are transmitted in an acyclic manner as required. The communication relations between the control node may thus be optimally adapted to the production and manufacturing conditions.

Further, the data transmission between subscribers in the control node may be carried out in the form of data imaging processes, each subscriber within the control node being configured to directly access the control node process image transmitted between the subscribers. This direct access in the internal data transmission in the control node allows for a very fast data exchange involving a low amount of protocol.

Each subscriber in the control node may be an organizational unit for processing a finite state machine determining the mode of operation and the state of operation, and a functional unit for carrying out the application program associated with the respective finite state machine. This configuration allows for configuring the individual subscribers in the control node as independent modules with a minimum amount of interfaces to the outside, thereby realizing an improved decentralized functionality of the control system while simultaneously reducing the complexity of the modules. Dividing up the subscribers into an organizational unit comprising the finite state machine and a functional unit executing the application programs allows for configuring the subscribers in any desired way and for correlating them, thus guaranteeing an simplified system control and optimal adaptation to the manufacturing and production processes.

Further, each subscriber may comprise an incident-recording unit configured to classify and to latch incidents, and a data-recording unit configured to latch data. This configuration allows for reducing the interfaces to the outside to two universal interfaces per subscriber, namely one for incidental logging and one for data logging.

The input/output unit of the subscribers may be configured variably, the input/output connections being defined as local variables comprising a wildcard address, the local variables being freely configurable. This procedure allows for adapting process flows within the control node to any desired production and manufacturing procedures without complex hardware and software modifications.

The system having a network of control nodes may comprise a network configurator configured to determine the communication relations between the control nodes and/or the subscribers in the control node. By means of this configuration, it is possible in a simple manner to react to extensions to and modifications of the production procedure. By simple re-programming, the network configurator allows for carrying out corresponding adaptations of the communication relations between the individual control nodes and/or the subscribers within the control node.

While the foregoing is directed to embodiments of the invention, other and further embodiments of this invention may be devised without departing from the basic scope of the invention, the scope of the present invention being determined by the claims that follow.

The invention claimed is:

1. A control node for a network of control nodes, data transmission between the control nodes in the network taking place in the form of data packets, the control node comprising:
 a transmitter module configured to manage the data to be sent in an output process image, to convert the output process image into a data packet and to output the data packet onto the network at a predetermined point in time,
 a receiver module configured to log on to the data packets of one or of a plurality of transmitter modules of further control nodes and to convert a received data packet into an input process image,
 a device specification stored in a memory area of the control node as a file, the device specification illustrating any of a hardware of the control node, a function of the control node and an interface of the control node to the outside, and
 a machine model imaging properties, the machine model being divided up into an organizing unit and a functional unit, the organizing unit determining operating states of the control node, the operating states of the control node indicating any of a manual operating mode, a semi-automatic operating mode and an automatic operating mode, and any of an initializing mode and a machine-operation mode, the functional unit comprising application programmes associated with the respective operating states, wherein the device specification is associated with the machine model.

2. The control node according to claim 1, the receiver module being configured to associate a quality date with the received data packets, the quality date indicating the age of the data packet.

3. The control node according to claim 1, the transmitter module being configured to directly address the data packet to one or to a plurality of further control nodes.

4. The control node according to claim 3, the transmitter module being configured to transmit non-real-time data to one or a plurality of further control nodes in an acyclic manner.

5. The control node according to claim 1, the transmitter module being configured to forward the data packet to all control nodes present in the network.

6. The control node according to claim 5, the transmitter module being configured to transmit real-time date to all control nodes present in the network in a cyclic manner.

7. The control node according to claim 1, wherein a data transmission between subscribers is carried out within the control nodes in the form of a data imaging process.

8. The control node according to claim 7, each subscriber comprising an organizing unit for processing a finite state machine which determines the mode and the state of operation, as well as a functional unit for carrying out the application program relevant for the respective current mode of operation and for the respective current state of operation.

9. The control node according to claim 1, comprising an incident-recording unit configured to classify and to latch incidents, as well as a data-recording unit configured to latch the data.

10. The control node according to claim 1, comprising an input/output unit configured to define input/output variables as local variables comprising wildcard addresses which are configurable.

11. A system comprising a network of control nodes and a network configurator, data transmission between the control nodes in the network taking place in the form of data packets,
 at least one control node being subdivided into subscribers, the subdivision of the control node into subscribers being freely configurable, each subscriber individually and in a self-sustained manner defining an accessible functionality of the control node,
 each control node comprising a transmitter module configured to manage the data to be sent in an output process image, to convert the output process image into a data packet and to output the data packet onto the network at a previously determined point in time,
 each control node comprising a receiver module configured to convert a received data packet into an input process image,
 the network configurator comprising a recording module in order to determine the control nodes connected to the network, a configuration module for determining the communication relations of the transmitter and receiver modules of the determining control nodes, the communication relations being determined on the basis of the number of control nodes determined by the recording module and on the basis of properties associated with the control nodes determined by the recording module, the communication relations defining which control node is to log on to which other control node by means of its receiver module to receive data from its transmitter module, as well as a programming module for transmitting the communication relations determined by the configuration module between the control nodes in the network to the control nodes,
 the receiver module of the control node being configured to log on for the data packets of one or of a plurality of transmitter modules of further control nodes on the basis of the communication relations determined by the configuration module, wherein the network configurator is configured to determine the communication relations between the control nodes and between the subscribers in the at least one control node, and wherein in an operation mode the network configurator is switched off or takes over a monitoring function and data transmission between the control nodes in the network is directly carried out from a transmitter module of a transmitting control node to at least a receiver module of a receiving control node in a point-to-point connection without any assistance of the network configurator.

12. The system according to claim 11, wherein a recording module of the network configurator transmits a broadcast telegram in the connected network for recording the control nodes connected to the system, the control nodes connected to the network responding to the broadcast telegram by means of an identification telegram.

13. The system according to claim 12, each control node sending an identification telegram to the recording module of the network configurator upon booting.

14. The system according to claim 11, each control node having a valid address which is definitely predetermined.

15. The system according to claim 11, each control node having a valid address which is retrieved by any of DHCP and AUTO-IP and which is transmitted to the network configurator.

16. The system according to claim 11, the network configurator being configured to determine incidental and process data streams between the control nodes within the network, and the control nodes being configured to carry out a mapping process across the network by converting a control node process image.

17. The system according to claim 11, the network configurator being configured to determine incidental and process data streams between subscribers in the control node in the form of a control node process image, and the subscribers in the control node being configured to carry out a local mapping by exchanging data with the process image.

18. A network comprising control nodes and a network configurator, data transmission between the control nodes in the network taking place in the form of data packets, each control node comprising a transmitter module configured to manage the data to be sent in an output process image, to convert the output process image into a data packet and to output the data packet onto the network at a previously determined point in time, each control node comprising a receiver module configured to convert a received data packet into an input process image, the network configurator comprising a recording module in order to determine the control nodes connected to the network, a configuration module for determining the communication relations of the transmitter and receiver modules of the determining control nodes, the communication relations being determined on the basis of the number of control nodes determined by the recording module and on the basis of properties associated with the control nodes determined by the recording module, the communication relations defining which control node is to log on to which other control node by means of its receiver module to receive data from its transmitter module, as well as a programming module for transmitting the communication relations determined by the configuration module between the control nodes in the network to the control nodes, the receiver module of the control node being configured to log on for the data packets of one or of a plurality of transmitter modules of further control nodes on the basis of the communication relations determined by the configuration module, wherein in an operation mode the network configurator is switched off or takes over a monitoring function and the data transmission between the control nodes in the network is directly carried out from the transmitter module of a transmitting control node to at least the receiver module of a receiving control node in a point-to-point connection without any assistance of the network configurator.

19. The network according to claim 18, wherein the receiver module of the control node is configured to associate a quality date with the received data packets, the quality date indicating the age of the data packet.

20. The network according to claim 18, wherein the transmitter module of the control node is configured to directly address the data packet to one or to a plurality of further control nodes.

21. The network according to claim 20, wherein the transmitter module of the control node is configured to transmit non-real time data to one or a plurality of further control nodes in an acyclic manner.

22. The network according to claim 18, wherein the transmitter module of the control node is configured to forward the data packet to all control nodes present in the network.

23. The network according to claim 22, wherein the transmitter module of the control node is configured to transmit real-time date to all control nodes present in the network in a cyclic manner.

24. The network according to claim 18, wherein each control node comprises an incident-recording unit configured to classify and to latch incidents, as well as a data-recording unit configured to latch the data.

25. The network according to claim 18, wherein each control node comprises an input/output unit configured to define input/output variables as local variables comprising wildcard addresses which are configurable.

26. The network according to claim 18, wherein the recording module of the network configurator transmits a broadcast telegram in the connected network for detecting the control nodes connected to the system, the control nodes connected to the network responding to the broadcast telegram by means of an identification telegram.

27. The network according to claim 26, wherein each control node sends an identification telegram to the recording module of the network configurator upon booting.

28. The network according to claim 26, wherein each control node has a valid address which is definitely predetermined.

29. The network according to claim 26, wherein each control node has a valid address which is retrieved by any of DHCP or AUTO-IP and which is transmitted to the network configurator.

30. The network according to claim 18, wherein the network configurator is configured to determine incidental and process data streams between the control nodes within the network, and the control nodes being configured to carry out a mapping process across the network by converting a control node process image.

31. The network according to claim 18, wherein a data transmission is carried out between subscribers within the control node in the form of a data imaging process.

32. The network according to claim 31, wherein each subscriber comprises an organizing unit for processing a finite state machine which determines the mode and the state of operation, as well as a functional unit for carrying out the application program relevant for the respective current mode of operation and for the respective current state of operation.

33. The network according to claim 31, wherein the network configurator is configured to determine incidental and process data streams between subscribers in the control node in the form of a control node process image, and the subscribers in the control node being configured to carry out a local mapping by exchanging data with the process image.

\* \* \* \* \*